United States Patent
Pinel et al.

(10) Patent No.: US 11,321,397 B2
(45) Date of Patent: May 3, 2022

(54) COMPOSITION ENGINE FOR ANALYTICAL MODELS

(71) Applicant: INTERNATIONAL BUSINESS MACHINES CORPORATION, Armonk, NY (US)

(72) Inventors: Florian Pinel, New York, NY (US); Russell P. Bobbitt, New York, NY (US); Chiao-Fe Shu, Scarsdale, NY (US)

(73) Assignee: International Business Machines Corporation, Armonk, NY (US)

( * ) Notice: Subject to any disclaimer, the term of this patent is extended or adjusted under 35 U.S.C. 154(b) by 864 days.

(21) Appl. No.: 16/135,943

(22) Filed: Sep. 19, 2018

(65) Prior Publication Data

US 2020/0089817 A1    Mar. 19, 2020

(51) Int. Cl.
*G06F 16/9038* (2019.01)
*G06F 9/455* (2018.01)
*G06N 20/00* (2019.01)
*G06F 16/93* (2019.01)

(52) U.S. Cl.
CPC ...... *G06F 16/9038* (2019.01); *G06F 9/45533* (2013.01); *G06F 16/93* (2019.01); *G06N 20/00* (2019.01)

(58) Field of Classification Search
CPC .. G06F 16/9038; G06F 16/93; G06F 9/45533; G06N 20/00
See application file for complete search history.

(56) References Cited

U.S. PATENT DOCUMENTS

| | | | |
|---|---|---|---|
| 9,762,450 B2 | 9/2017 | Xie et al. | |
| 9,876,684 B2 | 1/2018 | Gomadam et al. | |
| 2013/0042195 A1 | 2/2013 | Svoyatsky et al. | |
| 2017/0098009 A1* | 4/2017 | Srinivasan | G06F 16/80 |
| 2017/0262818 A1* | 9/2017 | Horrell | G06Q 10/0635 |
| 2017/0323089 A1* | 11/2017 | Duggal | H04L 67/00 |
| 2018/0129719 A1* | 5/2018 | Kim | G06F 16/258 |
| 2018/0365309 A1* | 12/2018 | Oliner | H04L 41/069 |
| 2019/0042286 A1* | 2/2019 | Bailey | G06F 9/455 |

OTHER PUBLICATIONS

"System and Method for the Efficient Extension of Workflow Systems with Case Handling Support," IPCOM000145902D, IBM, Jan. 31, 2007, 5 pages.

(Continued)

*Primary Examiner* — Hope C Sheffield
(74) *Attorney, Agent, or Firm* — Conley Rose, P.C.

(57) ABSTRACT

A computer-implemented method for executing a composition of analytical models. In one embodiment, the computer-implemented method creates analytical model composition definitions for a plurality of analytical models. The computer-implemented method receives analytical model definitions and an analytical model composition. The computer-implemented method binds the analytical model composition to the analytical model definitions. The computer-implemented method deploys the analytical model composition using the analytical model composition definitions. The computer-implemented method executes the analytical model composition and returns a result of the analytical model composition.

20 Claims, 8 Drawing Sheets

(56) References Cited

OTHER PUBLICATIONS

Anonymously, "Automated Text Parsing Communication Routing System," IPCOM000211865D, IBM, Oct. 21, 2011, 6 pages.
Raghuveer, et al., "Method and System using High-Level Language for Web Knowledge Extraction," IPCOM000214913D, Defensive Publication, Yahoo!, Feb. 13, 2012, 7 pages.
Caverlee, et al., "Workflow Management for Enterprise Transformation," Information Knowledge Systems Management 6, 2007, pp. 61-80.
Georgakopoulos, et al., "An Overview of Workflow Management: From Process Modeling to Workflow Automation Infrastructure," Distributed and Parallel Databases, 3, 1995, pp. 119-153.

* cited by examiner

```
{
 "id": "composition1",
 "name": "Face composition",
 "description": "Tags face image with age, gender, and combined",
 "type": "image classification",
 "flow": {
  "parallel": {
   "branches":
   [
     {
       "type": "image classification",
       "id": "face_age"
     },
     {
       "type": "image classification",
       "id": "face_gender"
     },
     {
       "type": "image classification",
       "id": "face_combined"
     }
   ]
  }
 }
}
```

```
{
  "id": "composition2",
  "name": "Age composition",
  "description": "Tags face image with age using several models",
  "type": "image classification",
  "flow": {
    "parallel": {
      "branches":
      [
        {
          "type": "image classification",
          "id": "face_age1"
        },
        {
          "type": "image classification",
          "id": "face_age2"
        },
        {
          "type": "image classification",
          "id": "face_age3"
        }
      ],
      "then": {
        "type": "function",
        "id": "face_age_average_openwhisk"
      }
    }
  }
}
```

```
{
  "id": "composition3",
  "name": "Object detection composition",
  "description": "object detection + tags",
  "type": "object recognition",
  "flow":
  {
    "type": "object recognition",
    "id": "persons_body_parts_vehicles",
    "then": {
      "parallel": {
        "branches":
        [
          {
            "adapter": {
              "type": "match label and crop",
              "parameters": {
                "label": "face",
                "crop" : [0.4, 0.4, 0.4, 0.4],
              },
              "type": "composition",
              "id": "composition1"
            }
          },
          {
            "adapter": {
              "type": "match label and crop",
              "parameters": {
                "label": "car",
                "crop" : [0.4, 0.4, 0.4, 0.4],
              },
              "parallel": {
                "branches":
                [
                  {
                    "type": "image classification",
                    "id": "car_model"
                  },
                  {
                    "type": "identification",
                    "id": "car_plate_reader"
                  }
                ],
              }
            }
          }
        ]
      }
    }
  }
}
```

COMPOSITION ENGINE FOR ANALYTICAL MODELS

BACKGROUND

An analytical model is a data model that can be used to analyze various input data to identify objects, identify relationships, answer questions, and/or predict outcomes. Analytical models may include machine learning (ML) models and deep learning models that are built using machine learning techniques. For example, the model builder in IBM Watson Studio® uses machine learning algorithms for building a model using training data to discover patterns in data, and construct mathematical models using these discoveries.

SUMMARY

The disclosed embodiments include a system, computer program product, and computer-implemented method for executing a composition of analytical models. In one embodiment, the computer-implemented method creates analytical model composition definitions for a plurality of analytical models. The computer-implemented method receives analytical model definitions and an analytical model composition. The computer-implemented method binds the analytical model composition to the analytical model definitions. The computer-implemented method deploys the analytical model composition using the analytical model composition definitions. The computer-implemented method executes the analytical model composition and returns a result of the analytical model composition.

Other embodiments and advantages of the disclosed embodiments are further described in the detailed description.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

The illustrated figures are only exemplary and are not intended to assert or imply any limitation with regard to the environment, architecture, design, or process in which different embodiments may be implemented.

DETAILED DESCRIPTION

It should be understood at the outset that, although an illustrative implementation of one or more embodiments are provided below, the disclosed systems, computer program product, and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

As used within the written disclosure and in the claims, the terms "including" and "comprising" are used in an open-ended fashion, and thus should be interpreted to mean "including, but not limited to". Unless otherwise indicated, as used throughout this document, "or" does not require mutual exclusivity, and the singular forms "a", "an" and "the" are intended to include the plural forms as well, unless the context clearly indicates otherwise.

A module or unit as referenced herein may comprise one or more hardware or electrical components such as electrical circuitry, processors, and memory that may be specially configured to perform a particular function. The memory may be volatile memory or non-volatile memory that stores data such as, but not limited to, computer executable instructions, machine code, and other various forms of data. The module or unit may be configured to use the data to execute one or more instructions to perform one or more tasks. In certain instances, a module may also refer to a particular set of functions, software instructions, or circuitry that is configured to perform a specific task. For example, a module may comprise of software components such as, but not limited to, data access objects, service components, user interface components, application programming interface (API) components; hardware components such as electrical circuitry, processors, and memory; and/or a combination thereof. As referenced herein, computer executable instructions may be in any form including, but not limited to, machine code, assembly code, and high-level programming code written in any programming language.

Also, as used herein, the term "communicates" means capable of sending and/or receiving data over a communication link. The communication link may include both wired and wireless links, and may be a direct link or may comprise of multiple links passing through one or more communication networks or network devices such as, but not limited to, routers, firewalls, servers, and switches. The communication networks may be any type of wired or wireless network. The networks may include private networks and/or public networks such as the Internet. Additionally, in certain embodiments, the term communicates may also encompass internal communication between various components of a system and/or with an external input/output device such as a keyboard or display device.

In real-life applications, multiple analytical models, such as machine learning (ML) models, can be called in sequence or in parallel. Additionally, conditional branches or functions can be applied to the input or output of the analytical models during the execution of the sequence. This order of analytical models along with any conditional branches or functions is referred to herein as a composition. As an example, for a visual recognition application, a first object recognition model can be used to identify hundreds of different objects, find their boundaries, and send the extracted portions of an image to specialized models that can, depending on the identified object, add more fine-grained attributes. For instance, an object recognition model is able to identify persons and cars, and other models can then identify a person's age and gender, or a vehicle's make and model; and a function can be used to average each model's prediction.

Currently, there is no language for model composition, and existing business process languages such as Business Process Execution Language (BPEL) cannot be used as ML models do not offer readily connectable inputs and outputs. Web service composition also doesn't address the deployment of the models. Accordingly, the present disclosure describes various embodiments for defining different types of ML models, compositions of ML models, adapters that allow these types to be composed into sequences or parallel branches, and an engine to bind and deploy the required models, and execute the model compositions.

In various embodiments, the scope of the disclosed embodiments can be extended beyond analytical models to various analytical components. For example, in various embodiments, additional node types can be defined to execute actions that aren't ML inferences (e.g. image extraction from a video, image modification, natural language processing, and invocation of external services). Further, while the below description is written for the visual recognition use case, the disclosed embodiments can be used for other applications such as, but not limited to, video analysis, audio recognition, machine translation, sentiment analysis, weather prediction, and forecasting.

Advantages of the disclosed embodiments include, but are not limited to, enabling users to easily create and modify compositions without writing code, and the same composition can be bound to different models to run in different environments (e.g. lightweight models may be used on the edge and more complex models run on the cloud using the same model composition).

Figure 1:
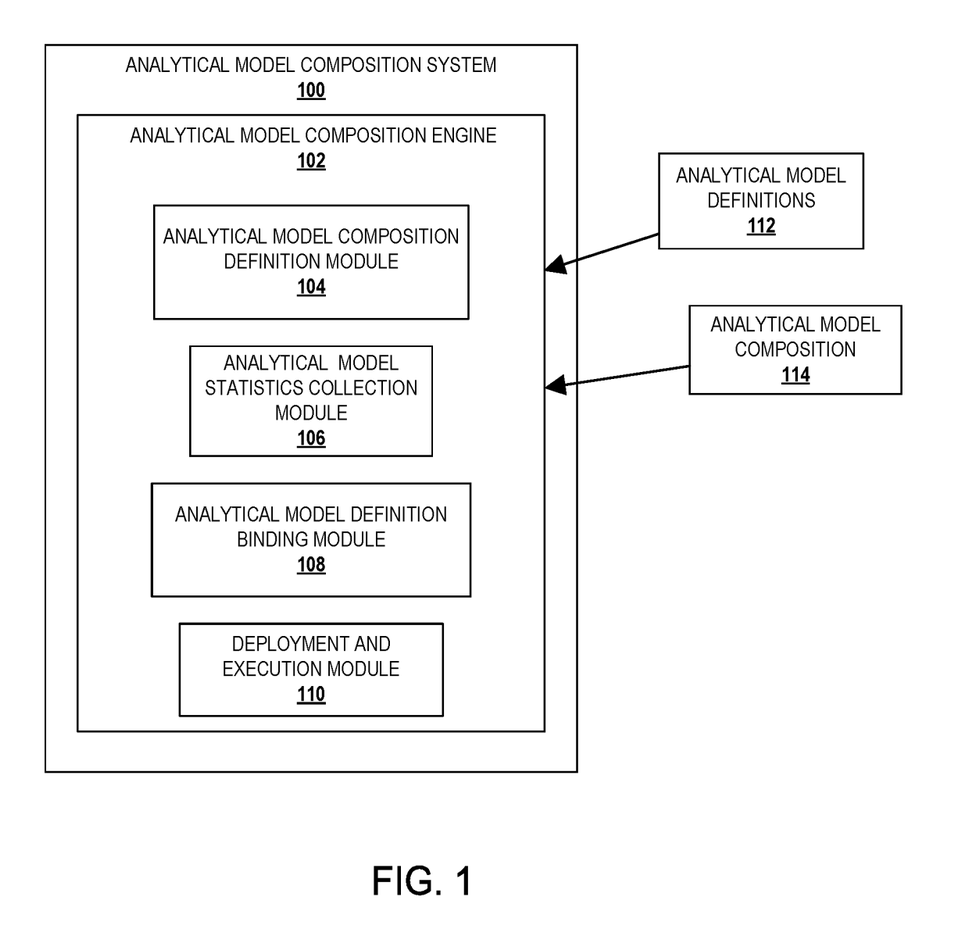
FIG. 1 is a schematic diagram illustrating an analytical model composition system in accordance with an embodiment of the present disclosure.

Referring now to the drawings, FIG. 1 is a schematic diagram illustrating an analytical model composition system 100 in accordance with an embodiment of the present disclosure. In the depicted embodiment, the analytical model composition system 100 includes an analytical model composition engine 102. The analytical model composition engine 102 is configured to enable a user to define different types of ML models, compositions of ML models, create adapters that allow these types to be composed into sequences or parallel branches, bind and deploy the required models, and execute the model compositions. As an example, the analytical model composition engine 102 may include an analytical model composition definition module 104, an analytical model statistics collection module 106, an analytical model definition binding module 108, and a deployment and execution module 110.

The analytical model composition definition module 104 is configured to enable a user to define the types of entities produced and consumed by the models, define the model types, and define the adapters between the model types. For example, for a visual recognition application, the types of entities produced and consumed by the models could be: video, image, bounding boxes, label, feature vector, and free-form text. Model types are groups of models with inputs and outputs of the same entity types. For example, the visual recognition application may include an image classification model type, object recognition model type, identification model type, feature extraction model type, and tracking model type.

In one embodiment, the image classification model type takes an image as an input, and returns one or more labels with confidence scores. A label is an output or a result of the model. For example, given an image containing objects A, B, and/or C, the image classification model may return a label for object B. The confidence score indicates the likelihood that the returned label is correct. For example, a 0.8 confidence may mean that model is 80% confident that the returned label is correct.

Non-limiting examples of models that may belong to the image classification model type may include an age classifier model, gender classifier model, and car model classifier model. A model type can include another model type. For example, an image classification type can include a color detection type. In one embodiment, the object recognition model type can be configured to receive an image as an input and return a list of labels with boundaries and confidence scores. In one embodiment, models belonging to the object recognition model type may include any object recognition model trained on the ImageNet dataset. ImageNet is a large image dataset designed for use in visual object recognition software currently containing over 14 million links to images that have been annotated to indicate what objects are pictured.

In one embodiment, the identification model type is used to perform various tasks including, but not limited to, labeling an image or sequence of images with a name, extracting text from the image, recognizing a face in the image, and/or generating text that describes the image. For example, the identification model type may receive an image as an input and return a string of free-form text describing objects in the image. Models belonging to the identification model type may include vehicle plate reader model, face recognition model, and a text extractor model. Similarly, a video identification model type may perform similar tasks using a video instead of an image as input. For example, an activity model may generate high-level activity labels from a sequence of video (e.g., group of people dancing, unloading a vehicle, etc.).

In one embodiment, the feature extraction model type takes an image as an input, and returns a feature vector. A feature vector is an n-dimensional vector of numerical features that represent some object. For example, a feature vector can be used to identify dimensions for facial recognition.

In one embodiment, the tracking model type operates in the spatiotemporal domain and is used to track objects in real-world scenes. For example, the tracking model type may take a sequence of images with detected objects as an input, and returns a set of object boundaries, where each boundary has an identifier (ID) unique to the image in which it occurs.

The analytical model composition definition module 104 is further configured to enable users to define the adapters between the model types. An adapter is an algorithm that converts the outputs of a model of type A into the inputs of a model of type B. For two different model types to be chained in sequence, an adapter that is compatible with their types is required to connect the two different model types. For example, the visual recognition application may require an image classification to image classification adapter that connects a first model to a second model. In one embodiment, the second model is triggered only if the top label returned by the first model is equal to a certain value. Another example of an adapter is an object recognition to image classification adapter that connects a first model to a second model. In one embodiment, the second model is triggered only if one of the labels returned by the first model is equal to a certain value, and the image is cropped to the boundaries of the recognized object before being passed to the model. The adapter algorithms can be scripts or code snippets that are executed by the disclosed composition engine. In various embodiments, other functions that transform model outputs can be defined the same way (e.g., take the outputs of several models and average the results).

In one embodiment, the analytical model statistics collection module 106 is configured to receive model definitions such as, but not limited to, analytical model definitions 112. A model definition is data that describes the attributes of a model. In some embodiments, a model definition can take the form of a virtual machine (VM) image definition (e.g. a docker file). The model definition may include a set of resources and parameters required to deploy the model into a computing environment. Non-limiting examples of attributes of a model definition may include tags and version numbers that allow users to have different models that perform the same task, metadata about the model inputs (e.g. shape of the images or feature vectors) and outputs (e.g. class labels), statistics about the model accuracy, hardware requirements, or performance, and data sets that can help produce the above statistics.

In an embodiment, if all the needed statistics were not provided with the model definition, the analytical model statistics collection module 106 is configured to deploy the model to collect statistics on the model using the data sets or test data provided with the model definition. If no test data is provided, the analytical model statistics collection module 106 can be configured to collects data from external libraries for use in gathering the model statistics. For example, the analytical model statistics collection module 106 can be configured to collect performance statistics of a car recognition model using the hardware available in the analytical model composition system 100. In one embodiment, the analytical model statistics collection module 106 is configured to deploy the model on a VM, collect test data from ImageNet, and performs various load tests.

In one embodiment, the analytical model definition binding module 108 is configured to receive a model composition from a user such as, but not limited to, analytical model composition 114. A model composition is a sequence or ordering of analytical models along with any conditional branches or functions. Analytical models in a model composition can be placed in series and/or in parallel. The analytical model composition 114 can be created by a user on the analytical model composition system 100 or can be created remotely and then transmitted to the analytical model composition system 100. The model compositions can take the form of a text document (for example, a JavaScript Object Notation (JSON) document) or a diagram. Non-limiting examples of model compositions are described in FIGS. 2A-2D. In various embodiments, the composition can reference specific model versions, or the model versions can be left open-ended to let the analytical model definition binding module 108 select the appropriate model binding.

The analytical model definition binding module 108 is configured to bind the model composition to model definitions. For each model that is referenced in the model composition, if the model version is left open-ended, the analytical model composition engine 102 can be configured to review all the available versions and either select one or make recommendations to the user. For example, in some embodiments, recommendations are based on one or more of the following criteria: accuracy of each model or combined accuracy of multiple models, performance of each model composition, and cost of the system resources needed to deploy the model.

In some embodiments, the analytical model definition binding module 108 is configured to call the analytical model statistics collection module 106 to collect statistics on the entire model composition using different bindings (e.g., different model versions), by first deploying the composition and then running the composition using test data.

The deployment and execution module 110 is configured to deploy the model composition. In one embodiment, the deployment and execution module 110 deploys each model definition into a VM. Each VM provides a server, the model files, and the ML framework needed to run the model. The deployment and execution module 110 is then configured to execute the model composition.

In certain embodiments, the analytical model composition engine 102 is available as a service or as an API. Whenever a model composition request is received, the analytical model composition engine 102 calls the deployed models (wrapped in a server, running on a VM) in the appropriate sequence, executing the code snippets that implement the model type adapters between each model call. The analytical model composition engine 102 returns a result at the end of the workflow.

Figure 2A:
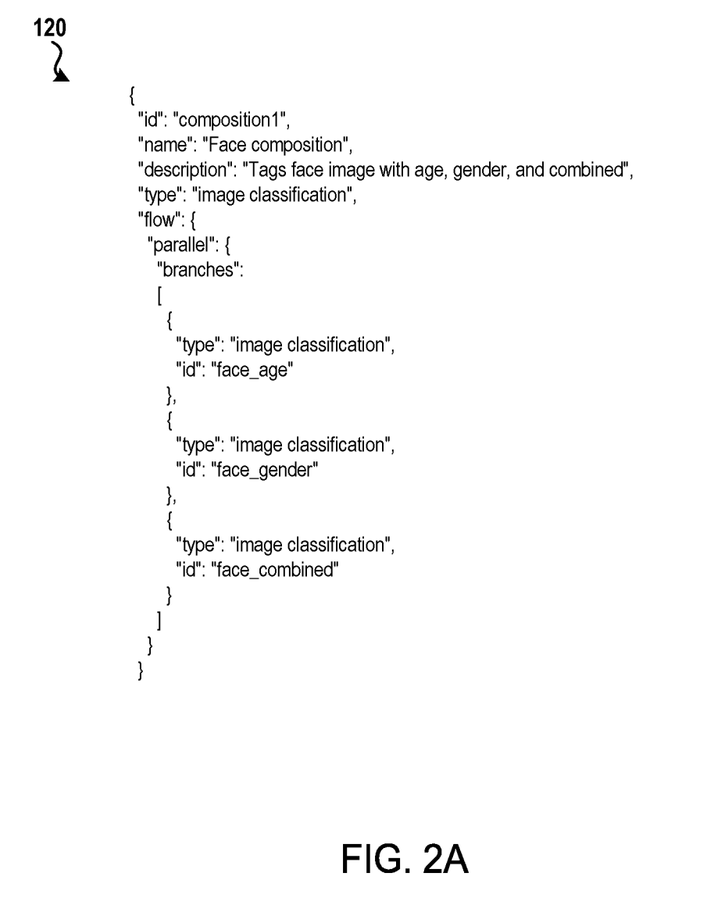
FIGS. 2A-2C illustrate examples of model compositions in text form in accordance with an embodiment of the present disclosure.
Figure 2B:
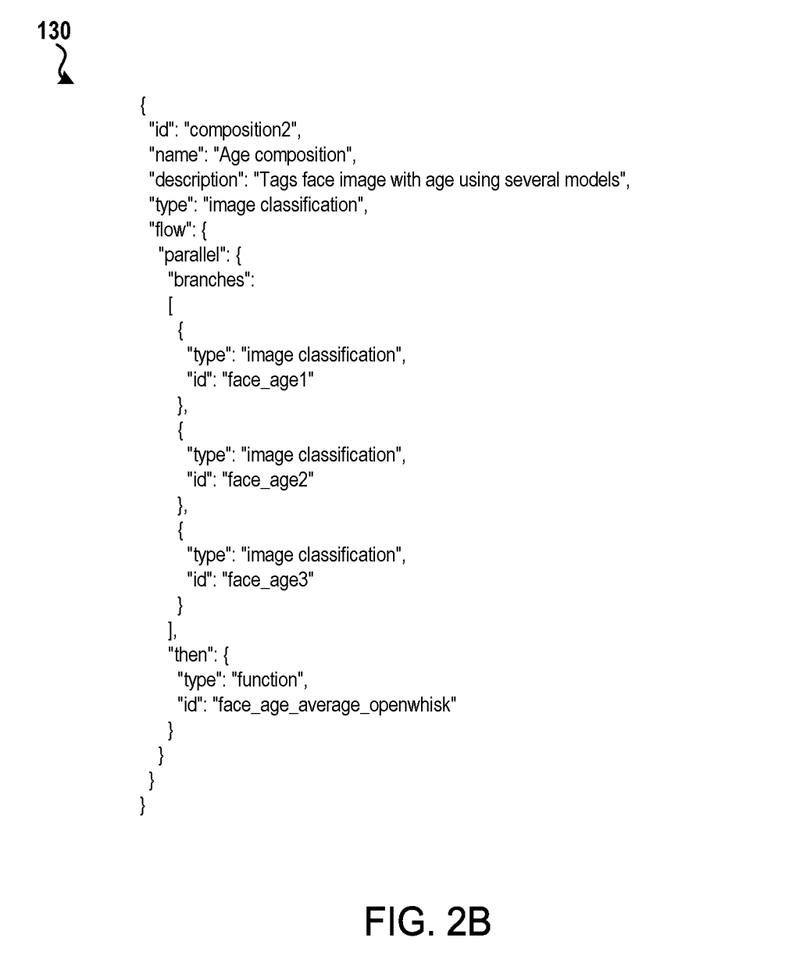
Figure 2C:
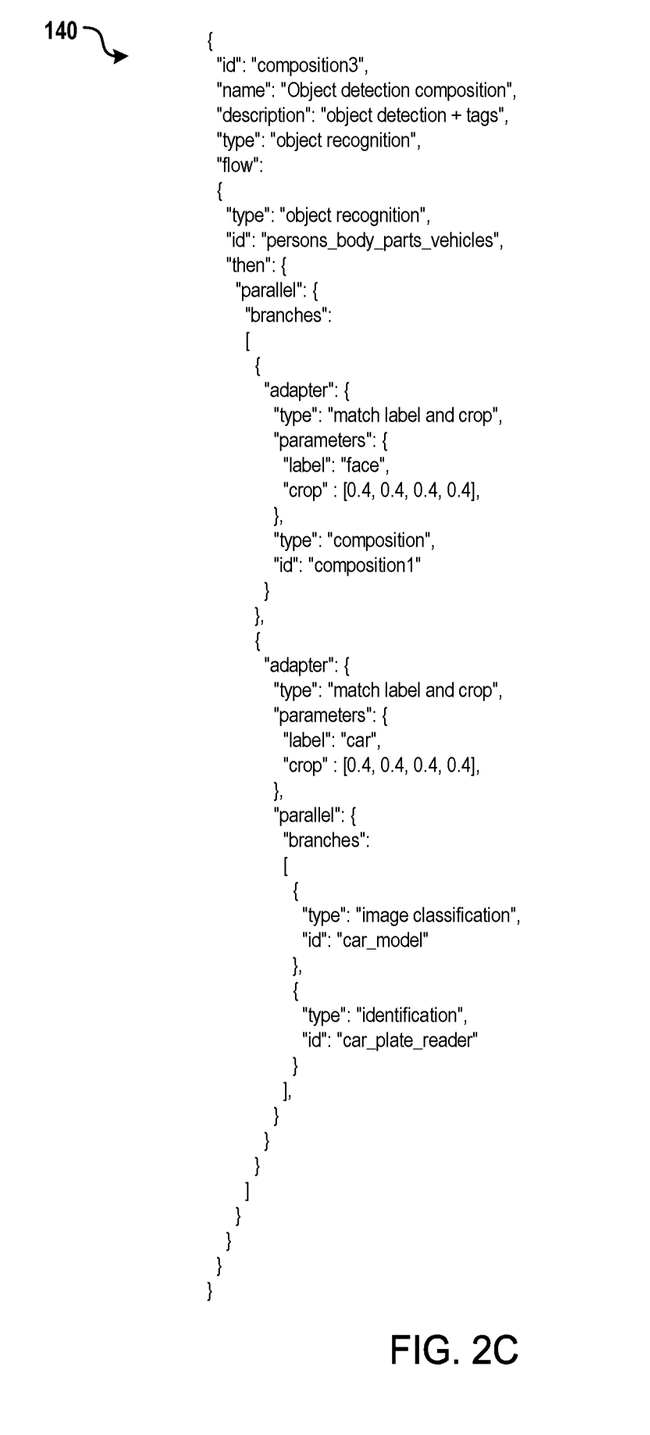

FIGS. 2A-2C illustrate examples of model compositions in text form in accordance with an embodiment of the present disclosure. As described above, the model compositions may be created by a user or other system, and submitted to the analytical model composition system 100 of FIG. 1 for creation and execution.

In the depicted embodiment of FIG. 2A, model composition 120 includes both an identifier (composition1) and a name (Face composition). Alternatively, in some embodiments, the model composition 120 may only include an identifier or a name for identifying the model composition, as opposed to both as shown in the disclosed embodiment. The model composition 120 also includes a description of the model composition. For example, the model composition 120 is configured to tag face image with age, gender, and combine face images into an output file. The type description refers to the model type, which is image classification in the model composition 120. The flow describes the sequence of the operation of the models. In the depicted embodiment, three model of type image classification, model id: face_age, model id: face_gender, and model id: face_combined are executed in parallel according to the model composition 120.

FIG. 2B illustrates a model composition 130 that includes a function within the model composition in accordance with an embodiment of the present disclosure. The model composition 130 has as an identifier of composition2 and is named age composition. The description of the model composition 130 is that it tags face image with age using several models. The model composition 130 is of type image classification. The description of the model composition 130 executes three image classification type models: face_age1, face_age2, and face_age3 in parallel branches. The output from each of the three models is then inputted into a function having an id: face_age_average_openwhisk that is configured to average the age results from the three models and return the average age.

FIG. 2C illustrates a model composition 140 that includes a function within the model composition in accordance with an embodiment of the present disclosure. The model composition 140 has as an identifier of composition3 and is named object detection composition. The description of the model composition 140 is that it detects objects in images and tags them (i.e., labels the object). The model composition 140 is of type object recognition meaning that its input and output is defined by the object recognition model type. The flow of the model composition 140 is that it executes the persons_body_parts_vehicles object recognition model type to identify a person's body parts and to identify vehicles. The results of the persons_body_parts_vehicles object recognition model are then outputted to two adapters that are executed in parallel. In one embodiment, an adapter is triggered only if the label returned by the persons_body_parts_vehicles object recognition model is equal to a certain value (i.e., "match label"). For example, if the label returned by the persons_body_parts_vehicles object recognition model matches the label of the first adapter (face), the first adaptor is configured to crop the face of a person from the images returned the persons_body_parts_vehicles object recognition model. Similarly, if the label returned by the persons_body_parts_vehicles object recognition model matches the label of the second adapter (car), the second adapter is configured to crop a car from the images returned the persons_body_parts_vehicles object recognition model. The cropped car image is then passed to two models in parallel. The first model is used to identify the car model in the image and the second model is used to read the license plate number of the vehicle.

Figure 2D:
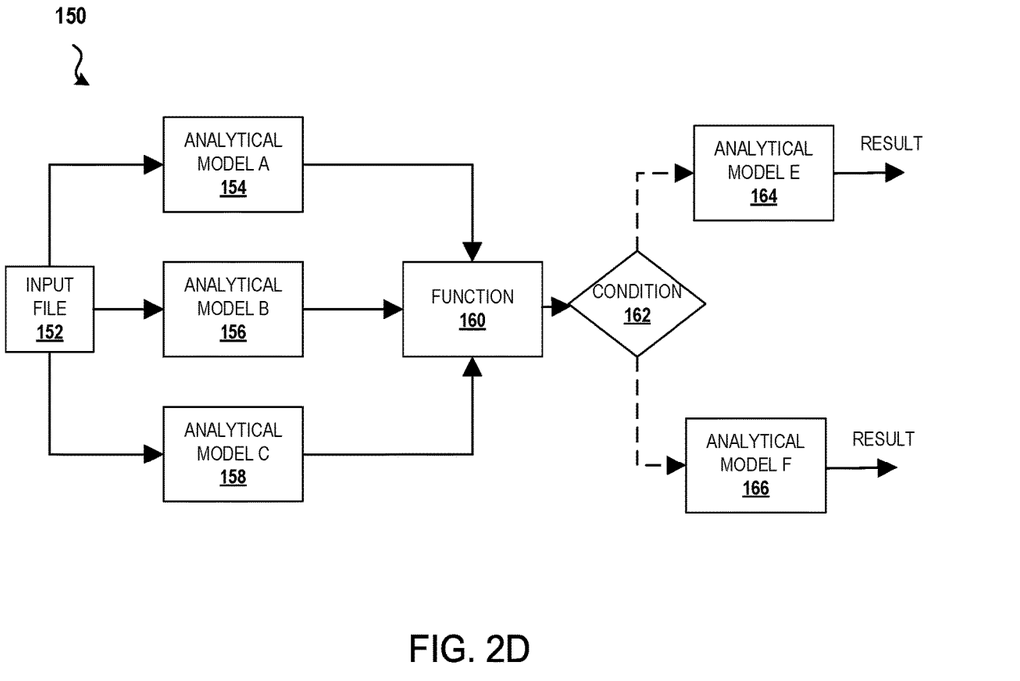
FIG. 2D illustrates an example of a model composition in diagram form in accordance with an embodiment of the present disclosure.

FIG. 2D illustrates a generic example of a model composition 150 in diagram form in accordance with an embodiment of the present disclosure. In certain embodiments, the analytical model composition engine 102 is configured to convert the model composition 150 in diagram form to text form such as illustrated in FIGS. 2A-2C. The model composition 150 starts with three different models in parallel (analytical model A 154, analytical model B 156, and analytical model C 158). Each of the three models receive input file 152 as input data. For example, input file 152 may a set of images. Each of the three models is configured to output a particular result based on the input file 152, which is then inputted into a function 160. As an example, the function 160 may determine an average of the result or select the highest or lowest result from the outputs of the three models. The result of the function 160 is then inputted into condition 162 to determine if a particular condition is met. For example, if the condition is that a vehicle identified in an image is presumed to have been manufactured within the past 10 years then the result is passed to an analytical model E 164 for identifying the make and model of the vehicle, otherwise the result is passed to an analytical model F 166 for identifying the make and model of older vehicles.

Figure 3:
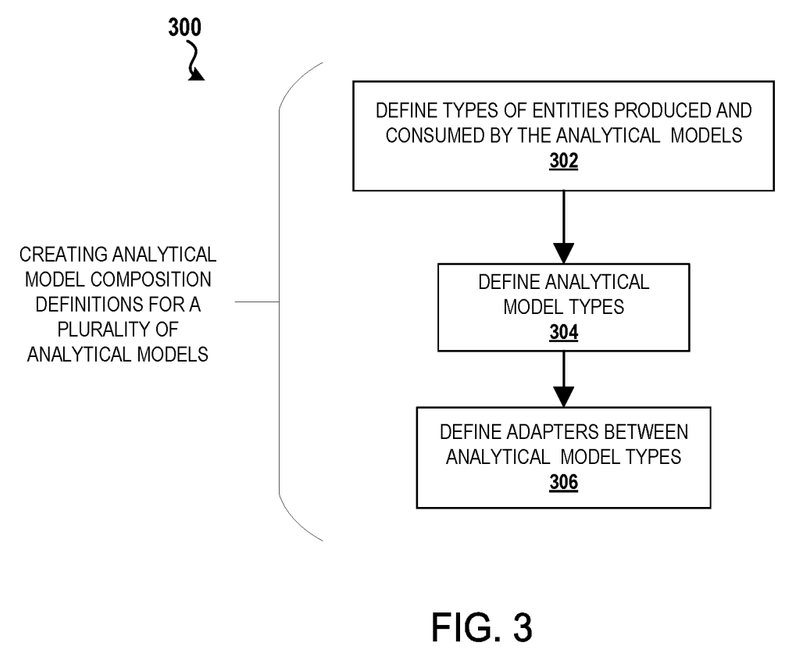
FIG. 3 is flowchart illustrating a process for creating analytical model composition definitions in accordance with an embodiment of the present disclosure.

FIG. 3 is flowchart illustrating a process 300 for creating analytical model composition definitions in accordance with an embodiment of the present disclosure. The process 300 may be executed by a system such as, but not limited to, the analytical model composition system 100 in FIG. 1. In the depicted embodiment, the process 300 begins, at step 302, by defining the types of entities produced and consumed by the analytical models. As stated above, for a visual recognition application, the types of entities produced and consumed by the models could be: video, image, label, feature vector, and free-form text. For an audio recognition application, the types of entities consumed by the models could be audio files or video/audio files, and the entities produced by the models could be extrapolated audio files of each individual speaker in the consumed filed, names of the speakers in the consumed file, labels of objects likely to produce the sounds heard in the consumed files. Still, other model types may consume an image file type and produce a numerical answer.

The process 300, at step 304, defines analytical model types. Model types are groups of models with inputs and outputs of the same entity types. As described above, various model types can be defined such as an object recognition model type that receive an image as an input and returns a list of labels with boundaries and confidence scores as an output.

The process 300, at step 306, defines adapters between analytical model types. An adapter is an algorithm that converts the outputs of a model of type A into the inputs of a model of type B. For two models that have different outputs to inputs, an adapter that's compatible with their types is used to connect the models in series.

Figure 4:
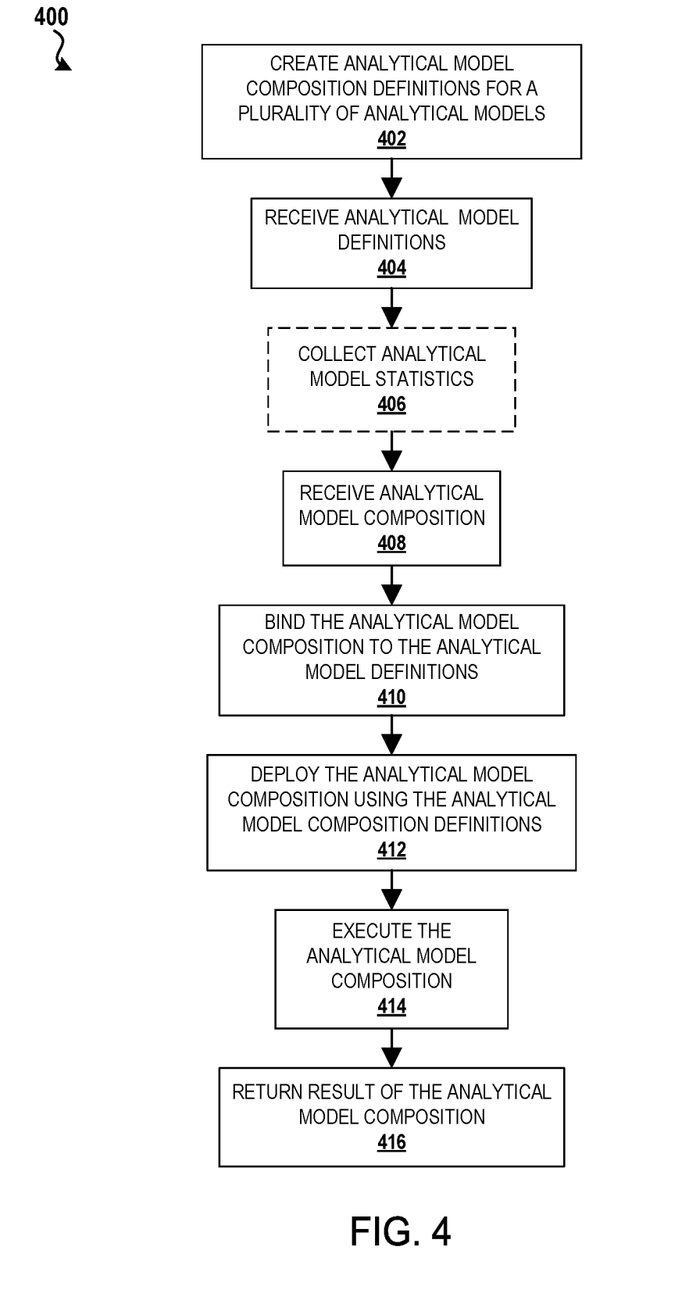
FIG. 4 is flowchart illustrating a process for executing a composition of analytical models in accordance with an embodiment of the present disclosure.

FIG. 4 is flowchart illustrating a process 400 for executing a composition of analytical models in accordance with an embodiment of the present disclosure. The process 400 can be executed by a system such as, but not limited to, the analytical model composition system 100 in FIG. 1. In the depicted embodiment, the process 400 begins, at step 402, by creating analytical model composition definitions for a plurality of analytical models. In one embodiment, the analytical model composition definitions are created using the process 300 described in FIG. 3. In some embodiments, the analytical model composition definitions may be created once and reused for various model compositions.

At step 404, the process 400 receives analytical model definitions. As described above, an analytical model definition is data that describes the attributes of a model. The analytical model definition may or may not include model statistics such as, but not limited to, performance characteristics, accuracy, and cost. The analytical model definition can be received from a user or from other systems such as a model database.

In certain embodiments, if necessary, the process 400, at step 406, collects analytical model statistics such as, but not limited to, model accuracy, hardware requirements, or performance. The process 400 may deploy the model to collect statistics on the model using the data sets or test data provided with the model definition or by using test data from external libraries.

The process 400, at step 408, receives an analytical model composition from a user or other requesting system. As described above, the analytical model composition can be received in various forms including text form (e.g., a text document or code) or in the form of a diagram. In some embodiments, the diagram can be received in various formats such as, but not limited to, an image format, in a text document or a presentation document, or in a particular diagram format (e.g., an application for creating diagrams).

At step 410, the process 400 binds the analytical model composition to the analytical model definitions. Binding means that a particular model definition is selected or mapped to the analytical model composition for use in the model composition. The binding process may involve selecting a particular version of a model or a model that satisfies a particular characteristic such as, but not limited to, a performance or accuracy characteristic.

The process 400, at step 412, deploys the analytical model composition using the analytical model composition definitions created in step 402. In one embodiment, the process 400 deploys each model definition into a VM that provides the necessary files and framework required to run the model.

The process 400, at step 414, executes the analytical model composition. At step 416, the process 400 returns the result of the analytical model composition. In certain embodiments, the result is presented on a display to the user, transmitted or returned to another system, and/or passed to another application.

Figure 5:
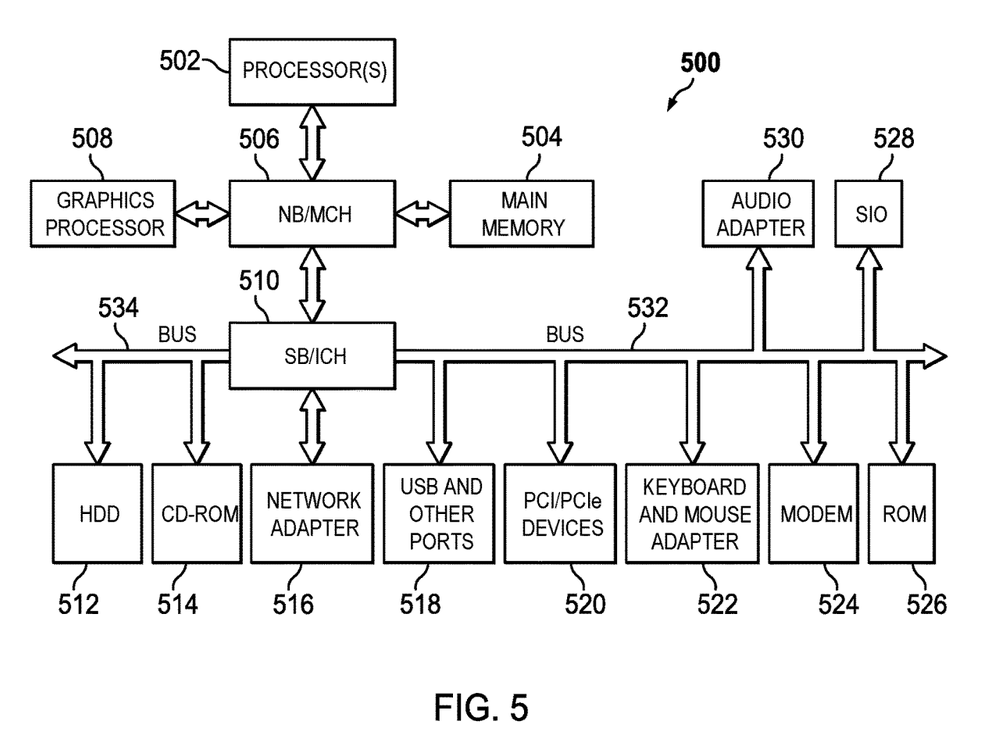
FIG. 5 is a block diagram illustrating a hardware architecture of a system according to an embodiment of the present disclosure.

FIG. 5 is a block diagram illustrating a hardware architecture of a data processing system 500 according to an embodiment of the present disclosure in which aspects or all of the illustrative embodiments may be implemented. For example, in one embodiment, any of the components in the analytical model composition system 100 of FIG. 1 may be implemented using the data processing system 500. Additionally, the data processing system 500 may be configured to store and execute instructions for performing the process described in FIGS. 3 and 4. In the depicted example, the data processing system 500 employs a hub architecture including north bridge and memory controller hub (NB/MCH) 506 and south bridge and input/output (I/O) controller hub (SB/ICH) 510. Processor(s) 502, main memory 504, and graphics processor 508 are connected to NB/MCH 506. Graphics processor 508 may be connected to NB/MCH 506 through an accelerated graphics port (AGP). A computer bus, such as bus 532 or bus 534, may be implemented using any type of communication fabric or architecture that provides for a transfer of data between different components or devices attached to the fabric or architecture.

In the depicted example, network adapter 516 connects to SB/ICH 510. Audio adapter 530, keyboard and mouse adapter 522, modem 524, read-only memory (ROM) 526, hard disk drive (HDD) 512, compact disk read-only memory (CD-ROM) drive 514, universal serial bus (USB) ports and other communication ports 518, and peripheral component interconnect/peripheral component interconnect express (PCI/PCIe) devices 520 connect to SB/ICH 510 through bus 532 and bus 534. PCI/PCIe devices may include, for example, Ethernet adapters, add-in cards, and personal computing (PC) cards for notebook computers. PCI uses a card bus controller, while PCIe does not. ROM 526 may be, for example, a flash basic input/output system (BIOS). Modem 524 or network adapter 516 may be used to transmit and receive data over a network.

HDD 512 and CD-ROM drive 514 connect to SB/ICH 510 through bus 534. HDD 512 and CD-ROM drive 514 may use, for example, an integrated drive electronics (IDE) or serial advanced technology attachment (SATA) interface. In some embodiments, HDD 512 may be replaced by other forms of data storage devices including, but not limited to, solid-state drives (SSDs). A super I/O (SIO) device 528 may be connected to SB/ICH 510. SIO device 528 may be a chip on the motherboard that is configured to assist in performing less demanding controller functions for the SB/ICH 510 such as controlling a printer port, controlling a fan, and/or controlling the small light emitting diodes (LEDS) of the data processing system 500.

The data processing system 500 may include a single processor 502 or may include a plurality of processors 502. Additionally, processor(s) 502 may have multiple cores. For example, in one embodiment, data processing system 500 may employ a large number of processors 502 that include hundreds or thousands of processor cores. In some embodiments, the processors 502 may be configured to perform a set of coordinated computations in parallel.

An operating system is executed on the data processing system 500 using the processor(s) 502. The operating system coordinates and provides control of various components within the data processing system 500 in FIG. 5. Various applications and services may run in conjunction with the operating system. Instructions for the operating system, applications, and other data are located on storage devices, such as one or more HDD 512, and may be loaded into main memory 504 for execution by processor(s) 502. In some embodiments, additional instructions or data may be stored on one or more external devices. The processes described herein for the illustrative embodiments may be performed by processor(s) 502 using computer usable program code, which may be located in a memory such as, for example, main memory 504, ROM 526, or in one or more peripheral devices.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random-access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN)

or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented method, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. Further, the steps of the methods described herein may be carried out in any suitable order, or simultaneously where appropriate. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for executing a composition of analytical models, the method comprising:
    creating analytical model composition definitions for a plurality of analytical models, wherein creating the analytical model composition definitions comprises defining model types for the plurality of analytical models, each model type having a defined input entity type and a defined output entity type, and further comprises defining adapters for converting the defined output entity type of a first model type to the defined input entity type of a second model type;
    receiving analytical model definitions describing attributes of each analytical model in the plurality of analytical models, wherein the analytical model definitions comprise a set of resources and parameters required to deploy each of the analytical models in the plurality of analytical models;
    receiving an analytical model composition comprising an ordered sequence of analytical models;
    binding the analytical model composition to the analytical model definitions;
    after binding the analytical model composition to the analytical model definitions, deploying the analytical model composition on a virtual machine (VM) using the analytical model composition definitions, the VM comprising model files and a machine learning (ML) framework required to run the analytical model composition;
    executing the analytical model composition in the VM by performing a plurality of model calls that call the analytical models in the ordered sequence of analytical models, and wherein the executing of the analytical model composition further comprises triggering execution of an analytical model in the ordered sequence of analytical models when a label returned by a preceding analytical model in the ordered sequence of analytical models is equal to a predetermined value; and
    returning a result of the analytical model composition from executing the analytical model composition in the VM.

2. The method of claim 1, wherein the analytical model composition further comprises at least one function that performs an operation based on an output of at least one of the analytical models in the ordered sequence of analytical models.

3. The method of claim 1, wherein the ordered sequence of analytical models comprises parallel branches.

4. The method of claim 1, wherein the analytical model composition further comprises conditional branches.

5. The method of claim 1, further comprising collecting model statistics for the analytical model definitions.

6. The method of claim 1, wherein the ordered sequence of analytical models comprises parallel branches comprising at least one analytical model, a function, a condition, and conditional branches comprising at least one analytical model, wherein the function performs an operation on a first output of the parallel branches to generate a second output, and wherein the condition determines which of the conditional branches to take based on the second output.

7. The method of claim 1, wherein the analytical model definitions are received as a virtual machine (VM) image definition.

8. The method of claim 1, wherein the analytical model composition is received as a text document.

9. The method of claim 1, wherein the analytical model composition is received as a diagram.

10. The method of claim 1, wherein binding the analytical model composition to the analytical model definitions comprises selecting a model version for each analytical model in the analytical model composition.

11. The method of claim 10, wherein selecting the model version for each analytical model in the analytical model composition comprises selecting the model version based on accuracy, performance, and computing cost associated with each model version.

12. A system configured to execute a composition of analytical models, the system comprising memory for storing instructions, and a processor configured to execute the instructions to:
   create analytical model composition definitions for a plurality of analytical models, wherein creating the analytical model composition definitions comprises defining model types for the plurality of analytical models, each model type having a defined input entity type and a defined output entity type, and further comprises defining adapters for converting the defined output entity type of a first model type to the defined input entity type of a second model type;
   receive analytical model definitions;
   receive an analytical model composition comprising an ordered sequence of analytical models;
   bind the analytical model composition to the analytical model definitions;
   after binding the analytical model composition to the analytical model definitions, deploy the analytical model composition on a virtual machine (VM) using the analytical model composition definitions;
   execute the analytical model composition in the VM by performing a plurality of model calls that call the analytical models in the ordered sequence of analytical models, and wherein the executing of the analytical model composition further comprises triggering execution of an analytical model in the ordered sequence of analytical models when a label returned by a preceding analytical model in the ordered sequence of analytical models is equal to a predetermined value; and
   return a result of the analytical model composition from executing the analytical model composition in the VM.

13. The system of claim 12, wherein creating the analytical model composition definitions comprises defining types of entities produced and consumed by the plurality of analytical models.

14. The system of claim 12, wherein creating the analytical model composition definitions further comprises defining model types for the plurality of analytical models.

15. The system of claim 14, wherein creating the analytical model composition definitions further comprises defining adapters between the model types.

16. The system of claim 12, wherein the processor further executes instructions to collect model statistics for the analytical model definitions.

17. The system of claim 12, wherein the analytical model composition is received as a diagram.

18. A non-transitory computer program product for executing a composition of analytical models, the computer program product comprising a computer readable storage medium having program instructions embodied therewith, the program instructions executable by a processor to cause the processor to:
   create analytical model composition definitions for a plurality of analytical models, wherein creating the analytical model composition definitions comprises defining model types for the plurality of analytical models, each model type having a defined input entity type and a defined output entity type, and further comprises defining adapters for converting the defined output entity type of a first model type to the defined input entity type of a second model type;
   receive analytical model definitions;
   receive an analytical model composition comprising an ordered sequence of analytical models;
   bind the analytical model composition to the analytical model definitions;
   after binding the analytical model composition to the analytical model definitions, deploy the analytical model composition on a virtual machine (VM) using the analytical model composition definitions;
   execute the analytical model composition in the VM by performing a plurality of model calls that call the analytical models in the ordered sequence of analytical models, and wherein the executing of the analytical model composition further comprises triggering execution of an analytical model in the ordered sequence of analytical models only when a label returned by a preceding analytical model in the ordered sequence of analytical models is equal to a predetermined value; and
   return a result of the analytical model composition.

19. The non-transitory computer program product of claim 18, wherein creating the analytical model composition definitions comprises:
   defining types of entities produced and consumed by the plurality of analytical models;
   defining model types for the plurality of analytical models; and
   defining adapters between the model types.

20. The non-transitory computer program product of claim 18, wherein the plurality of analytical models are machine learning models.

* * * * *